Oct. 8, 1946.   A. G. ELLIOTT   2,408,743
JET PROPULSION APPARATUS FOR AIRCRAFT
Filed Oct. 7, 1943   2 Sheets-Sheet 1
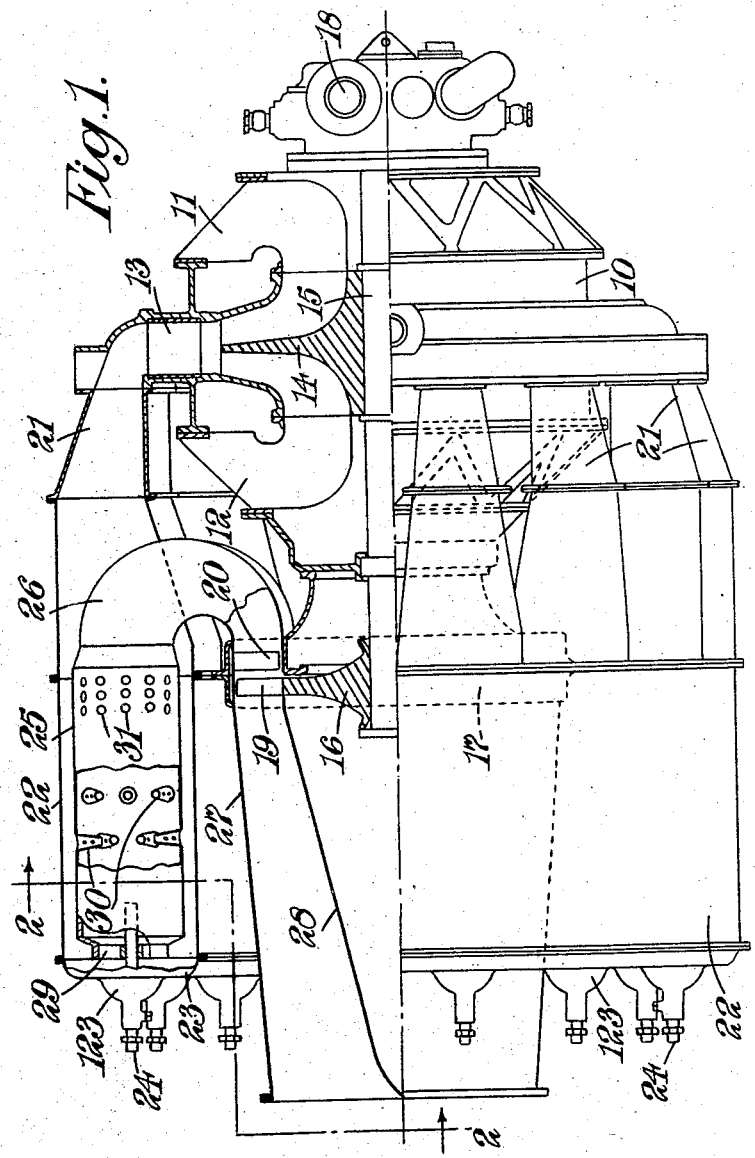
INVENTOR
Albert George Elliott
BY Loyd Hall Sutton
ATTORNEY Oct. 8, 1946.  A. G. ELLIOTT  2,408,743
JET PROPULSION APPARATUS FOR AIRCRAFT
Filed Oct. 7, 1943  2 Sheets-Sheet 2
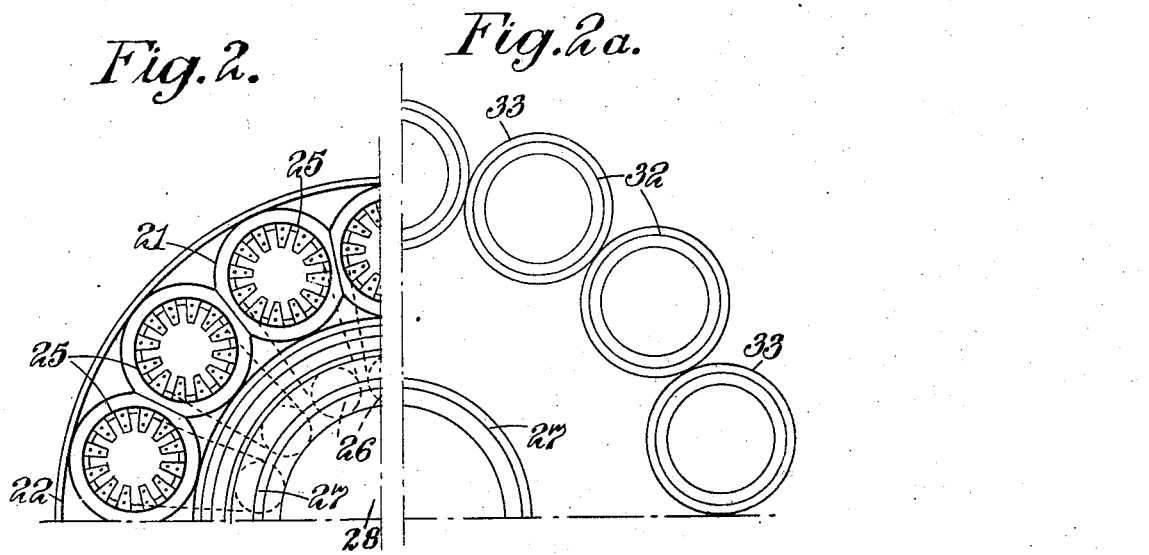
INVENTOR
Albert George Elliott
BY
Loyd Hall Sutton
ATTORNEY Patented Oct. 8, 1946

2,408,743

UNITED STATES PATENT OFFICE 2,408,743

JET-PROPULSION APPARATUS FOR AIRCRAFT

Albert George Elliott, Quarndon, Derby, England

Application October 7, 1943, Serial No. 505,394
In Great Britain May 18, 1942

1 Claim. (Cl. 60—35.6)

This invention relates to jet-propulsion apparatus for aircraft and has for its object to provide an improved construction thereof. The invention is concerned with apparatus of the kind comprising a centrifugal air-compressor, a gas-turbine co-axial with, and to the rear of the compressor to which it is coupled to drive it, a jet outlet co-axial with and to the rear of the turbine and compressor through which outlet the gases passing through the turbine are discharged rearwardly as a jet propelling the aircraft, a number of cylindrical outer chambers, each closed at its rear end, which are mounted parallel to the axis of the turbine and compressor in a ring around the jet outlet and to the front ends of which air under pressure is delivered by the compressor, an equal number of cylindrical open-ended combustion chambers mounted one in each cylindrical outer chamber, a separate fuel-injection nozzle for each combustion chamber arranged to direct the fuel forwardly into its combustion chamber where it is burnt and ducts for conveying the products of combustion from the front ends of the combustion chambers through the turbine, to drive it, to the jet outlet from which they are discharged.

According to the present invention, the ring of cylindrical outer chambers in a jet-propulsion apparatus of the above kind is replaced by a single annular chamber closed at its rear end in which the combustion chambers and the associated fuel-injection nozzles are mounted so that they can be more closely spaced together, being, if desired, in contact with one another, and can be brought closer to the axis of the turbine and compressor whereby a reduction can be obtained in the overall diameter of the apparatus in the order of 15 to 20% whilst still providing adequate cross-sectional area for the flow of the air and the products of combustion. This reduction in the diameter is of importance in aircraft as it reduces the frontal area of the apparatus and therefore the drag. At the same time a considerable reduction in weight of the apparatus is achieved.

A construction in accordance with this invention will now be described, by way of example only, with reference to the accompanying drawings in which:

Figure 1 is an elevation, half in section, of a jet-propulsion apparatus for aircraft embodying the invention, Figure 2 is a quarter section on the line 2—2 of Figure 1 and Figure 2a is a similar section through the prior construction.

All figures of the drawings are diagrammatic.

The apparatus comprises an air-compressor 10 (Figure 1) of the double entry type with two annular air inlets 11 and 12 and a central annular outlet chamber 13. The rotor 14 of the compressor is secured on a shaft 15 that is mounted to rotate in suitable bearings and has the rotor 16 of a gas-turbine 17 secured on it. This shaft also drives a number of auxiliary devices mounted on the front end 18 of the apparatus and may be rotated by a suitable starting motor, not shown, to start the apparatus. The turbine 17 comprises blades 19 carried by the rotor and stator blades 20 mounted in an annular chamber. The gas-turbine drives the compressor and the auxiliary devices.

Air under pressure is led from the outlet chamber 13 of the compressor through fourteen ducts, or some other suitable number, 21 to the front end of an annular chamber 22 which is co-axial with the shaft 15. The rear end of the chamber 22 is closed by a detachable cover 23 which is formed with fourteen domed portions 123 in line with the ducts 21. A fuel-injection nozzle 24 is mounted in each domed portion and fourteen cylindrical combustion chambers 25 are mounted in the annular chamber in line with the fuel-injection nozzles and the ducts 21. Each nozzle directs fuel forwardly into an associated combustion chamber where the fuel is burnt in the compressed air which enters the combustion chamber mainly at its rear end from the annular chamber 22. The products of combustion are discharged from the front end of each combustion chamber through a separate converging duct 26 to the turbine 17 which they drive. The products of combustion, after passing through the turbine, are finally discharged through an annular jet-outlet formed by co-axial tube 27 and conical insert 28 which are co-axial with the shaft 15 and provide a diverging passage between them to reduce the velocity of the gases which emerge as a jet providing the propulsive force for an aircraft in which the apparatus is mounted.

Vanes 29 are provided at the rear end of each combustion chamber to impart a swirling motion to the air entering the combustion chamber and assist combustion and air-jets 30 are provided to admit additional air from the annular chamber 22 as jets directed rearwardly against the main flow of the air through the combustion chamber so as to increase the turbulence and improve combustion. Secondary air is admitted from the annular chamber 22 to the front end of each combustion chamber through openings 31 and serves to complete the combustion.

It will be observed from Figure 2 that the combustion chambers can be closely spaced together so that they lie on a smaller circle than in the prior arrangement indicated in Figure 2a in which each combustion chamber is mounted in a separate outer chamber 32 which must be spaced apart to accommodate the flanges 33 by which they are mounted and their rear end covers are secured on them. The present arrangement, thus provides a substantial reduction in the overall diameter and the weight of the apparatus, and reduces the heat-radiating surface as compared with the known arrangement of separate combustion chambers.

I claim:

A jet-propulsion apparatus for aircraft, comprising a central air-compressor, a gas-turbine co-axial with, and to the rear of the compressor and coupled to the compressor to drive it, a gas outlet co-axial with and to the rear of the turbine and the compressor, through which outlet gases passing through the turbine are discharged rearwardly as a jet propelling the aircraft, a single annular chamber closed at its rear end and surrounding the jet outlet co-axially therewith, at least one passage through which air under pressure is delivered by the compressor to the front end of the annular chamber, a number of cylindrical open-ended combustion chambers mounted in the annular chamber in closely spaced side by side relationship with their axes equally spaced and parallel with the axis of the turbine and compressor, a fuel-injection nozzle for each combustion chamber arranged to direct the fuel forwardly into its combustion chamber and ducts for conveying the products of combustion from the front ends of the combustion chambers through the turbine, to drive it, and hence to the jet outlet from which they are discharged.

ALBERT GEORGE ELLIOTT.